US008998764B2

United States Patent
Sten et al.

(10) Patent No.: US 8,998,764 B2
(45) Date of Patent: Apr. 7, 2015

(54) DRIVE MODULE HAVING PLANETARY TRANSMISSION WITH NESTED RING GEARS

(71) Applicant: eAAM Driveline Systems AB, Trollhättan (SE)

(72) Inventors: Erik J. Sten, Trollhättan (SE); Thomas C. Bengtsson, Stenungsund (SE)

(73) Assignee: e-AAM Driveline Systems AB, Trollhättan (SE)

( * ) Notice: Subject to any disclaimer, the term of this patent is extended or adjusted under 35 U.S.C. 154(b) by 106 days.

(21) Appl. No.: 13/798,539

(22) Filed: Mar. 13, 2013

(65) Prior Publication Data
US 2014/0274527 A1 Sep. 18, 2014

(51) Int. Cl.
F16H 48/08 (2006.01)
F16H 1/46 (2006.01)
B60K 1/00 (2006.01)

(52) U.S. Cl.
CPC ............ F16H 1/46 (2013.01); B60K 2001/001 (2013.01)

(58) Field of Classification Search
CPC .............................. F16H 57/0482; F16H 48/36
USPC .................................. 475/205, 221, 160, 341
See application file for complete search history.

(56) References Cited

U.S. PATENT DOCUMENTS

| | | | |
|---|---|---|---|
| 5,242,336 A | 9/1993 | Hori | |
| 6,027,424 A | 2/2000 | Reynolds | |
| 6,123,640 A | 9/2000 | Schulz | |
| 7,081,063 B2 | 7/2006 | Hori et al. | |
| 7,223,198 B2 | 5/2007 | Kimes et al. | |
| 7,399,247 B2 | 7/2008 | Kempf et al. | |
| 8,206,258 B2 | 6/2012 | Ziemer | |
| 8,591,371 B2 * | 11/2013 | Dinter et al. | 475/160 |
| 2001/0031682 A1 * | 10/2001 | Auer et al. | 475/331 |
| 2004/0248695 A1 * | 12/2004 | Wang et al. | 475/331 |
| 2009/0221396 A1 | 9/2009 | Berg et al. | |
| 2011/0243740 A1 | 10/2011 | Siegfriedsen | |
| 2011/0256977 A1 | 10/2011 | Hart et al. | |
| 2012/0083384 A1 | 4/2012 | Ziemer et al. | |
| 2012/0088628 A1 | 4/2012 | Ziemer et al. | |

* cited by examiner

Primary Examiner — Ramya Burgess
Assistant Examiner — Lillian Nguyen
(74) Attorney, Agent, or Firm — Harness, Dickey & Pierce, P.L.C.

(57) ABSTRACT

A drive module with a planetary transmission that includes a transmission housing, a first ring gear and a second ring gear. The first ring gear is rotatably mounted in the transmission housing, the second ring gear is non-rotatably mounted in the transmission housing, and the first ring gear is supported on the second ring gear to thereby align a central axis of the first ring gear to a central axis of the second ring gear.

21 Claims, 5 Drawing Sheets

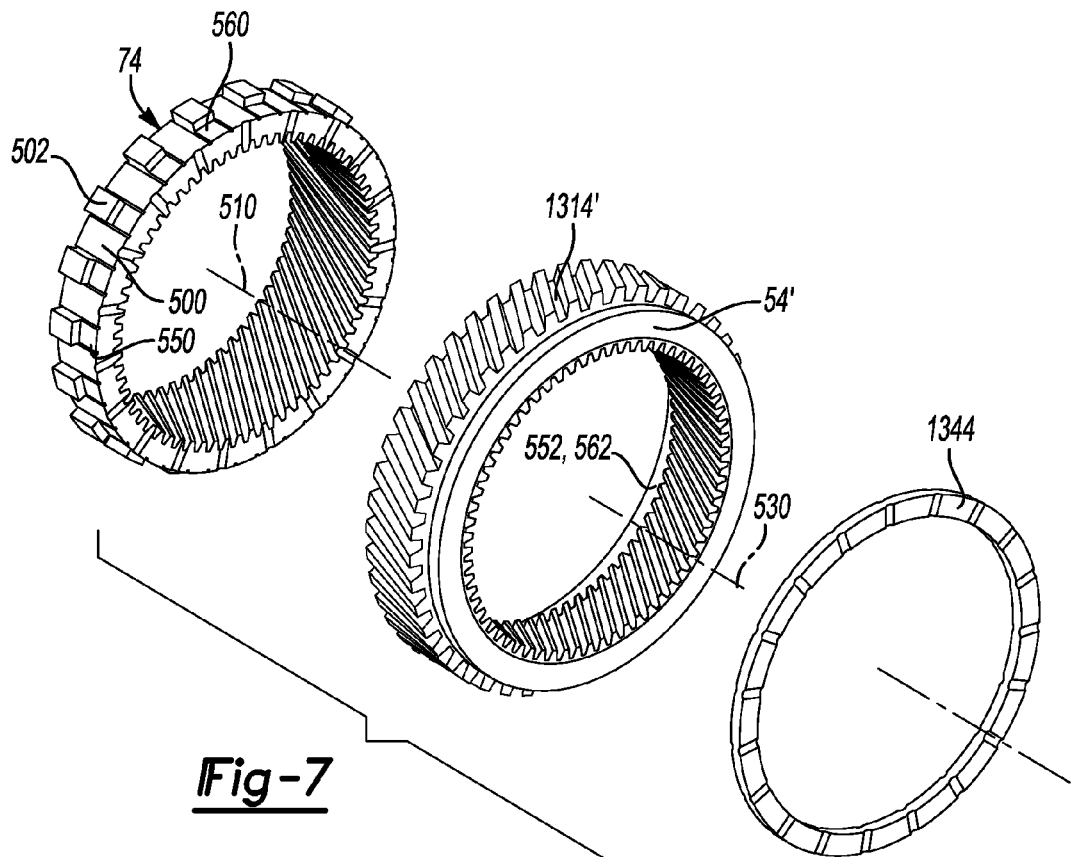
_Fig-7_
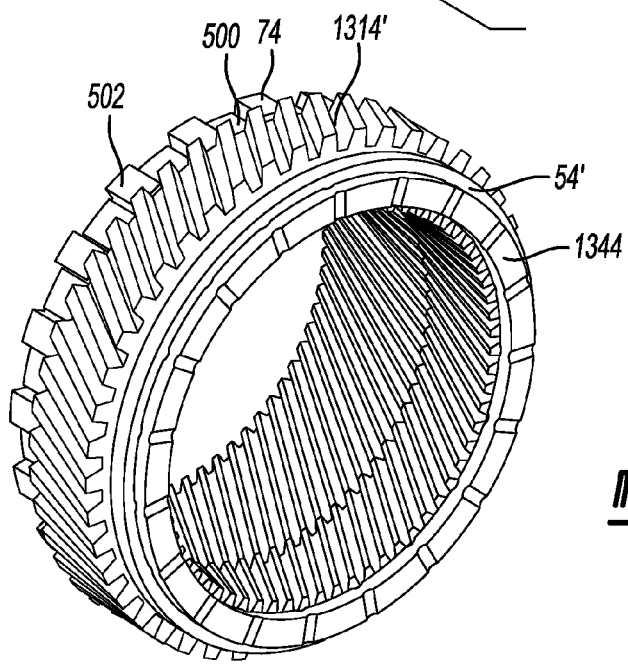
_Fig-8_

DRIVE MODULE HAVING PLANETARY TRANSMISSION WITH NESTED RING GEARS

FIELD

The present disclosure relates to a transmission and a drive module that have two or more planetary stages in which two or more of the ring gears are nested.

BACKGROUND

This section provides background information related to the present disclosure which is not necessarily prior art.

A drive module is disclosed in U.S. Patent Application Publication No. 2012/058855. While such drive modules are satisfactory for their intended purposes, they are nevertheless susceptible to improvement.

SUMMARY

This section provides a general summary of the disclosure, and is not a comprehensive disclosure of its full scope or all of its features.

In one form, the teachings of the present disclosure provide a drive module that includes a transmission, a differential assembly and first and second shafts. The transmission has a transmission housing, a first planetary gearset and a second planetary gearset. The first planetary transmission has a first ring gear and a first transmission output member. The second planetary transmission has a second ring gear and a second transmission output member. The differential assembly has a differential case, which is rotatably coupled to the second transmission output member, a first differential output and a second differential output. The first shaft is coupled for rotation to both the first differential output and the first transmission output. The second shaft is coupled to the second differential output for rotation therewith. The first ring gear is rotatably mounted in the transmission housing and the second ring gear is non-rotatably mounted in the transmission housing. The first and second ring gears nest such that one of the first and second ring gears has a bearing hub that is received into a bushing bore that is formed into the other one of the first and second ring gears. The bearing hub frictionally engages an inside surface of the bushing bore when the bearing hub is received into the bushing bore to thereby align a central axis of the first ring gear to a central axis of the second ring gear.

In another form, the teachings of the present disclosure provide a drive module that includes a transmission, a differential assembly and first and second shafts. The transmission has a transmission housing, a first planetary gearset and a second planetary gearset. The first planetary transmission has a first ring gear and a first transmission output member. The second planetary transmission has a second ring gear and a second transmission output member. The differential assembly has a differential case, which is rotatably coupled to the second transmission output member, a first differential output and a second differential output. The first shaft is coupled for rotation to both the first differential output and the first transmission output. The second shaft is coupled to the second differential output for rotation therewith. The first ring gear is rotatably mounted in the transmission housing. The first and second ring gears nest such that one of the first and second ring gears has a bearing hub that is received into a bushing bore that is formed into the other one of the first and second ring gears. The bearing hub frictionally engages an inside surface of the bushing bore when the bearing hub is received into the bushing bore to thereby align a central axis of the first ring gear to a central axis of the second ring gear.

In yet another form, the teachings of the present disclosure provide a drive module that includes a transmission, a differential assembly and first and second shafts. The transmission has a transmission housing, a first planetary gearset and a second planetary gearset. The first planetary transmission has a first ring gear and a first transmission output member. The second planetary transmission has a second ring gear and a second transmission output member. The differential assembly has a differential case, which is rotatably coupled to the second transmission output member, a first differential output and a second differential output. The first shaft is coupled for rotation to both the first differential output and the first transmission output. The second shaft is coupled to the second differential output for rotation therewith. The first ring gear is rotatably mounted in the transmission housing, the second ring gear is non-rotatably mounted in the transmission housing, and the first ring gear is supported on the second ring gear to thereby align a central axis of the first ring gear to a central axis of the second ring gear.

In still another form, the teachings of the present disclosure provide a transmission having a transmission housing, a first ring gear and a second ring gear. The first ring gear is rotatably mounted in the transmission housing, the second ring gear is non-rotatably mounted in the transmission housing, and the first ring gear is supported on the second ring gear to thereby align a central axis of the first ring gear to a central axis of the second ring gear.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 7 and 8 are view that are similar to those of FIGS. 3 and 6, respectively, but depicting a first ring gear of the transmission with a differently configured toothed exterior surface.

Corresponding reference numerals indicate corresponding parts throughout the several views of the drawings.

DETAILED DESCRIPTION

Figure 1:
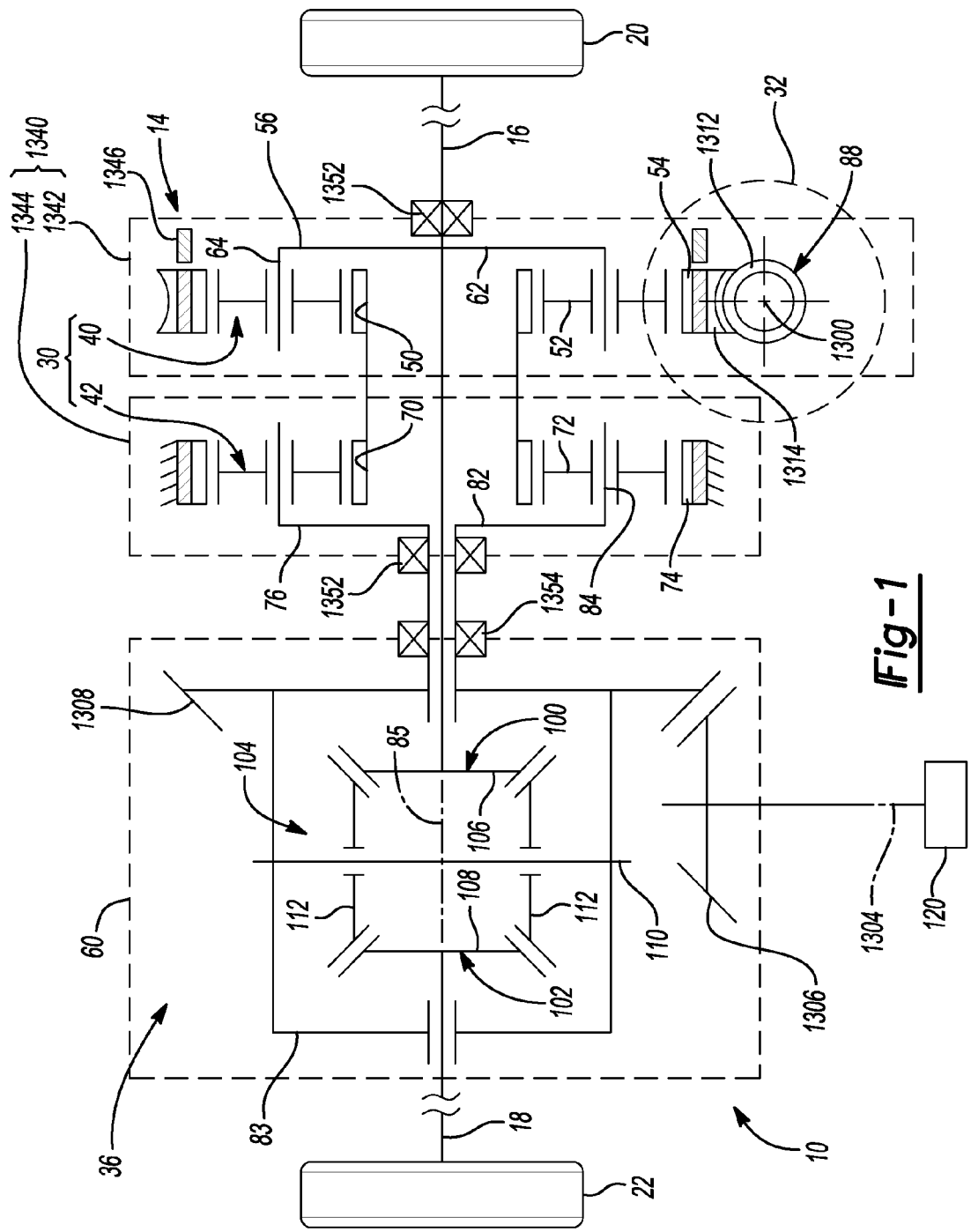
FIG. 1 is a schematic cross-sectional view of an exemplary drive module constructed in accordance with the teachings of the present disclosure.
Figure 2:
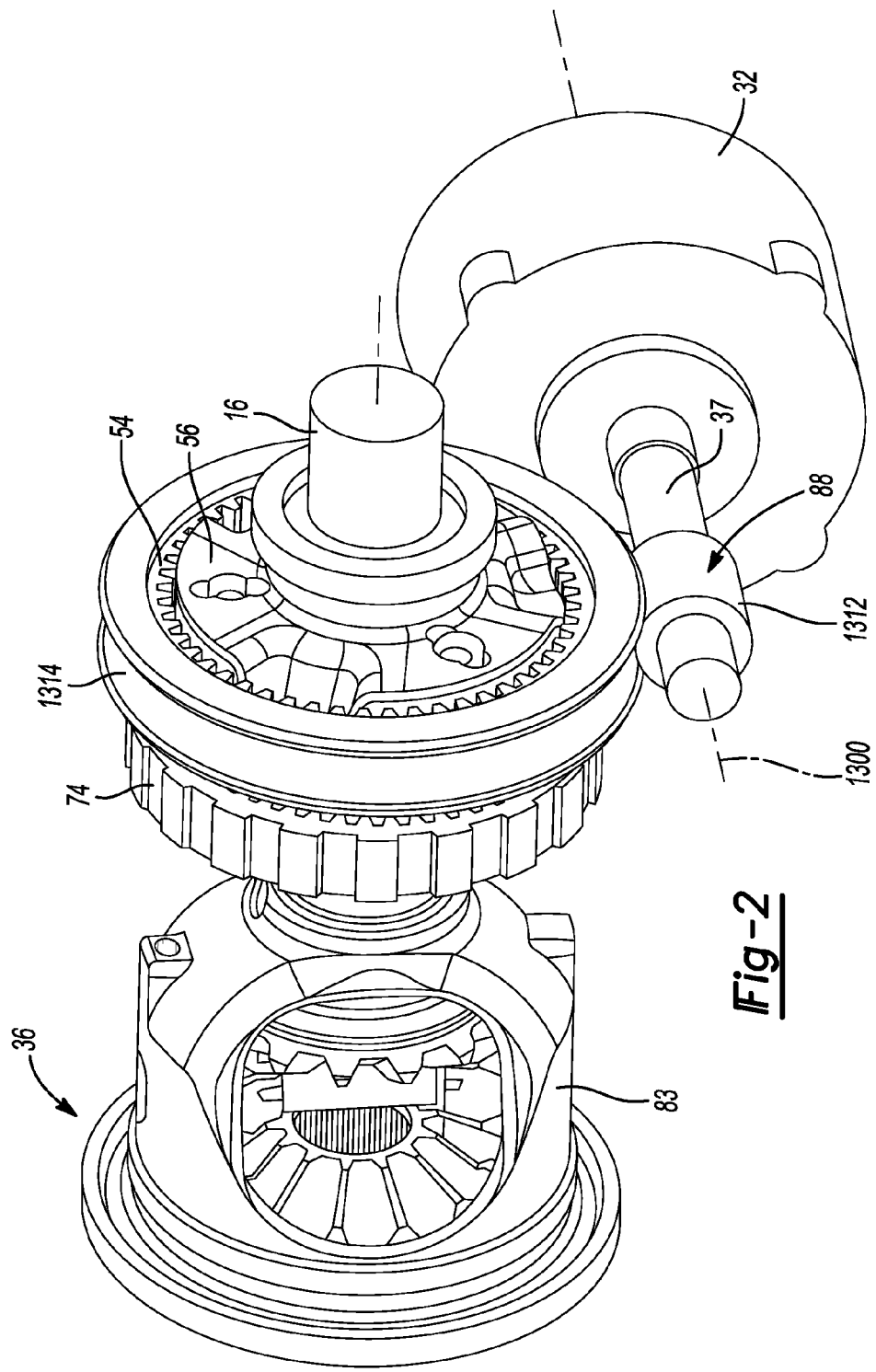
FIG. 2 is a perspective view of a portion of the drive module of FIG. 1.
Figure 3:
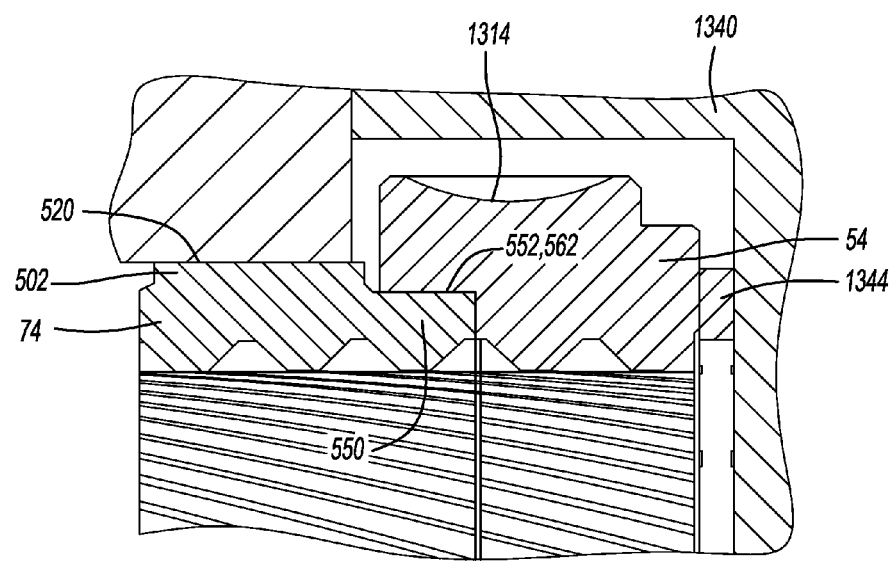
FIG. 3 is a longitudinal portion of the drive module of FIG. 1 illustrating a portion of a transmission in more detail.

With reference to FIGS. 1 and 2 of the drawings, an axle assembly constructed in accordance with the teachings of the present disclosure is generally indicated by reference numeral 10. The axle assembly 10 could be a front axle assembly for a vehicle, but in the particular example provided, the axle assembly 10 is a rear axle assembly. The axle assembly 10 can include a torque distribution drive mechanism 14 that may be used for transmitting torque to a first output member 16 and a second output member 18, which are illustrated as being first and second axle shafts, respectively, in the present example. For example, the first output member 16 may be coupled to a left wheel 20 and the second output member 18 may be coupled to a right wheel 22 of the axle assembly 10. In particular and as further explained below, the torque distribution drive mechanism 14 may be used for torque vectoring, that is, to generate a torque difference between the first and second output members 16 and 18.

The torque distribution drive mechanism 14 can comprise a dual planetary gear set 30 and a drive member 32. The dual planetary gear set 30 and a reduction gear 88 associated with the drive member 32 can be housed in a (transmission) housing 1340 that can comprise a first housing shell 1342 and a second housing shell 1344 that are fixedly coupled to one another via a set of fasteners (not shown). The drive member 32 can be mounted to a flange formed on the first housing shell 1342.

The dual planetary gear set 30 can be co-axially mounted with respect to the first and second output members 16 and 18 and/or a differential assembly 36. The dual planetary gear set 30 can comprise a first planetary gear set 40 and a second planetary gear set 42. The first and second planetary gear sets 40 and 42 can have identical gear ratios and can be configured such that one or more of the components of the first planetary gear set 40 is/are interchangeable with associated component(s) of the second planetary gear set 42.

The first planetary gear set 40 can comprise a first sun gear 50, a plurality of first planet gears 52, a first ring gear 54, and a first planet carrier 56. The first sun gear 50 can be a generally hollow structure that can be mounted concentrically about the first output member 16. The first planet gears 52 can be spaced circumferentially about the first sun gear 50 such that teeth of the first planet gears 52 meshingly engage teeth of the first sun gear 50. Likewise, the first ring gear 54 can be disposed concentrically about the first planet gears 52 such that the teeth of the first planet gears 52 meshingly engage teeth on the first ring gear 54. The first ring gear 54 can be rotatably disposed in the first housing shell 1342, which can be non-rotatably coupled to a carrier housing 60 that houses the differential assembly 36. A thrust washer 1346 can be disposed between the first ring gear 54 and the first housing shell 1342. The first planet carrier 56 can include a first carrier body 62 and a plurality of first pins 64 that can be fixedly coupled to the first carrier body 62. The first carrier body 62 can be coupled to the first output member 16 such that the first carrier body 62 and the first output member 16 co-rotate. Any suitable means may be employed to couple the first carrier body 62 to the first output member 16, including welds and mating teeth or splines. Each of the first pins 64 can be received into an associated one of the first planet gears 52 and can support the associated one of the first planet gears 52 for rotation about a longitudinal axis of the first pin 64.

The second planetary gear set 42 can comprise a second sun gear 70, a plurality of second planet gears 72, a second ring gear 74, and a second planet carrier 76. The second sun gear 70 can be a generally hollow structure that can be mounted concentrically about the first output member 16. The second sun gear 70 can be non-rotatably coupled to the first sun gear 50 (e.g., the first and second sun gears 50 and 70 can be integrally and unitarily formed). The second planet gears 72 can be spaced circumferentially about the second sun gear 70 such that the teeth on the second planet gears 72 meshingly engage teeth of the second sun gear 70. The second ring gear 74 can be disposed concentrically about the second planet gears 72 such that the teeth of the second planet gears 72 meshingly engage teeth on the second ring gear 74. The second ring gear 74 can be non-rotatably coupled to the second housing shell 1344. The second planet carrier 76 can include a second carrier body 82 and a plurality of second pins 84 that can be fixedly coupled to the second carrier body 82. The second carrier body 82 can be coupled to a housing or differential carrier 83 of the differential assembly 36 such that the second carrier body 82 and the differential carrier 83 co-rotate. Each of the second pins 84 can be received into an associated one of the second planet gears 72 and can support the associated one of the second planet gears 72 for rotation about a longitudinal axis of the second pin 84.

The first and second planetary gear sets 40 and 42 can be co-aligned about a common longitudinal axis (i.e., an axis that can extend through the first and second sun gears 50 and 70) and can be offset from one another axially along the common longitudinal axis 85.

The drive member 32 can be any means for providing a rotary input to the dual planetary gear set 30, such as an electric or hydraulic motor, and can be employed to drive an input member (e.g., reduction gear 88) that transmits rotary power to a transmission input of the first planetary gear set 40. The drive member 32 can be any type of motor, such as an AC electric motor or a DC electric motor, and can have an output shaft 37 to which the reduction gear 88 can be rotatably coupled.

While the particular example provided employs a drive member 32 and a reduction gear 88 that are arranged about a rotational axis 1300 that is perpendicular to the rotational axes 85 of the differential carrier 83 and the first planet carrier 56, it will be appreciated that other configurations could be employed in the alternative and as such, the particular example provided is not intended to be limiting in any manner. For example, the rotational axis 1300 can be orthogonal to the rotational axes 85 of the differential carrier 83 and the first planet carrier 56 and a rotational axis 1304 of a rotary power source 120 that is configured to be a source of propulsive power, such as an internal combustion engine, an electric motor or a hydraulic motor. The rotary power source 120 can drive an input pinion 1306 (e.g., via a propshaft or motor output shaft (not shown)) that is meshed with a ring gear 1308 that can be coupled to the differential carrier 83 in a conventional manner.

In the example provided, the reduction gear 88 can be a worm 1312 that can be meshingly engaged to a worm gear 1314. The worm gear 1314 can be rotatably coupled to the first ring gear 54 (e.g., formed on an outer surface of the first ring gear 54). The worm 1312 and worm gear 1314 can be relatively small in size but nonetheless provide a relatively large gear reduction ratio. Consequently, the drive member 32 can be configured to produce a relatively high-speed, low torque output.

In addition to the differential housing 60 and the differential carrier 83, the differential assembly 36 can include a means for transmitting rotary power from the differential carrier 83 to the first and second output members 16 and 18. The rotary power transmitting means can include a first differential output 100 and a second differential output 102. In the particular example provided, the rotary power transmitting means comprises a differential gear set 104 that is housed in the differential carrier 83 and which has a first side gear 106, a second side gear 108, a cross-pin 110 and a plurality of pinion gears 112. The first and second side gears 106 and 108 can be rotatably disposed about a rotational axis of the differential carrier 83 and can comprise the first and second differential outputs 100 and 102, respectively. The first output member 16 can be coupled to the first side gear 106 for common rotation, while the second output member 18 can be coupled to the second side gear 108 for common rotation. The cross-pin 110 can be mounted to the differential carrier 83 generally perpendicular to the rotational axis of the differential carrier 83. The pinion gears 112 can be rotatably mounted on the cross-pin 110 and meshingly engaged with the first and second side gears 106 and 108.

While the differential assembly 36 has been illustrated as employing bevel pinions and side gears, it will be appreciated that other types of differential mechanisms could be employed, including differential mechanisms that employ helical pinion and side gears or planetary gear sets.

If desired, the worm 1312 and worm gear 1314 can be configured to be self-locking when the drive member 32 is not actively powered to effectively lock the differential assembly 36 to inhibit speed differentiation between the first and second output members 16 and 18. In this regard, locking of the worm 1312 and worm gear 1314 inhibits rotation of the first ring gear 54. Since the second planet carrier 76 and the differential carrier 83 are coupled for rotation, rotation of the differential carrier 83 (via rotation of the differential ring gear 1308 resulting from rotation of the input pinion 1306) can provide a rotary input to the second planet carrier 76, which causes the second planet gears 72 of the second planetary gear set 42 to rotate within the second ring gear 74 and rotate the second sun gear 70. Rotation of the second sun gear 70 causes rotation of the first sun gear 50, causing rotation of the first planet gears 52 of the first planetary gear set 40, which, in turn, causes the first planet carrier 56 to rotate. Since the first planet carrier 56 is coupled to the first output member 16, and since the first and second planetary gear sets 40 and 42 have identical gear reduction ratios, the first and second planet carriers 56 and 76 rotate at the same rate (i.e., at the rate at which the differential carrier 83 rotates). As such, the first output member 16 cannot rotate relative to the differential carrier 83 so that the differential gear set 104 is locked to the differential carrier 83.

For the worm 1312 and worm gear 1314 to be self-locking, the worm gear 1314 cannot "back drive" the worm 1312. As those of skill in the art will appreciate, the ability for the worm 1312 and worm gear 1314 to lock depends on several factors, including the lead angle, the pressure angle and the coefficient of friction, but often times the analysis can be reduced to a rough approximation involving the coefficient of friction and the tangent of the lead angle (i.e., self-locking if tangent of the lead angle<coefficient of friction).

Seals 1352 can be employed to seal the interface between the housing 1340 and the first output member 16 and between the housing 1340 and the portion of the second planet carrier 76 that is rotatably coupled to the differential carrier 83. Additionally, a seal 1354 can be received in the carrier housing 60 in which the differential carrier 83 is disposed to seal the interface between the carrier housing 60 and the portion of the second planet carrier 76 that is rotatably coupled to the differential carrier 83.

With reference to FIGS. 3 through 6, the first and second ring gears 54 and 74 are illustrated in more detail. As described above, the first ring gear 54 is rotatably mounted in the transmission housing 1340 and includes a toothed exterior surface (i.e., the worm gear 1314) and a toothed interior surface that is meshingly engaged by the first planet gears 52 (FIG. 1). The second ring gear 74 can include a generally cylindrically-shaped body 500 and a plurality of lugs 502 that are circumferentially spaced about the body 500. The body 500 can be sized to tightly fit in a corresponding bore (not specifically shown) in the transmission housing 1340 to thereby align a central axis 510 of the second ring gear 74 to the centerline of the bore in the transmission housing 1340. The lugs 502 can be received into corresponding recesses 520 formed in the transmission housing 1340 to thereby inhibit rotation of the second ring gear 74 relative to the transmission housing 1340. The first and second ring gears 54 and 74 can nest to align a central axis 530 of the first ring gear 54 to the central axis 510 of the second ring gear 74. To facilitate nesting of the first and second ring gears 54 and 74, one of the first and second ring gears 54 and 74 (i.e., the second ring gear 74 in the example provided) can have a bearing hub 550 that can be received into a bushing bore 552 that is formed into the other one of the first and second ring gears 54 and 74 (i.e., the first ring gear 54 in the example provided). An exterior surface 560 of the bearing hub 550 can frictionally engage an inside surface 562 of the bushing bore 552 when the bearing hub 550 is received into the bushing bore 552 to thereby align the central axis 530 of the first ring gear 54 to the central axis 510 of the second ring gear 74.

Figure 4:
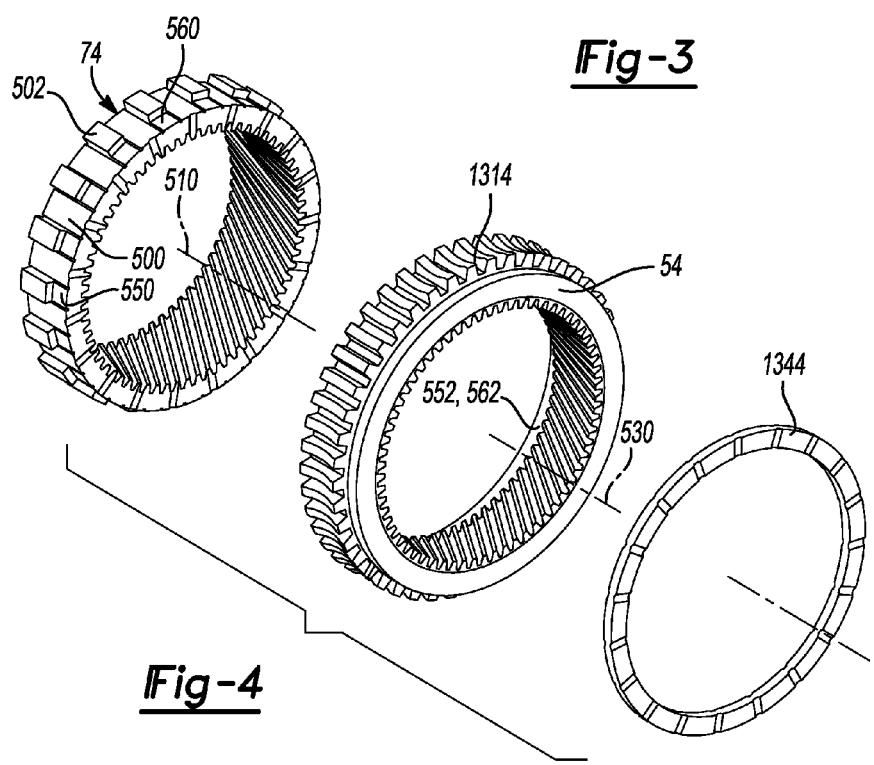
FIG. 4 is an exploded perspective view of a portion of the transmission of the drive module of FIG. 1.
Figure 5:
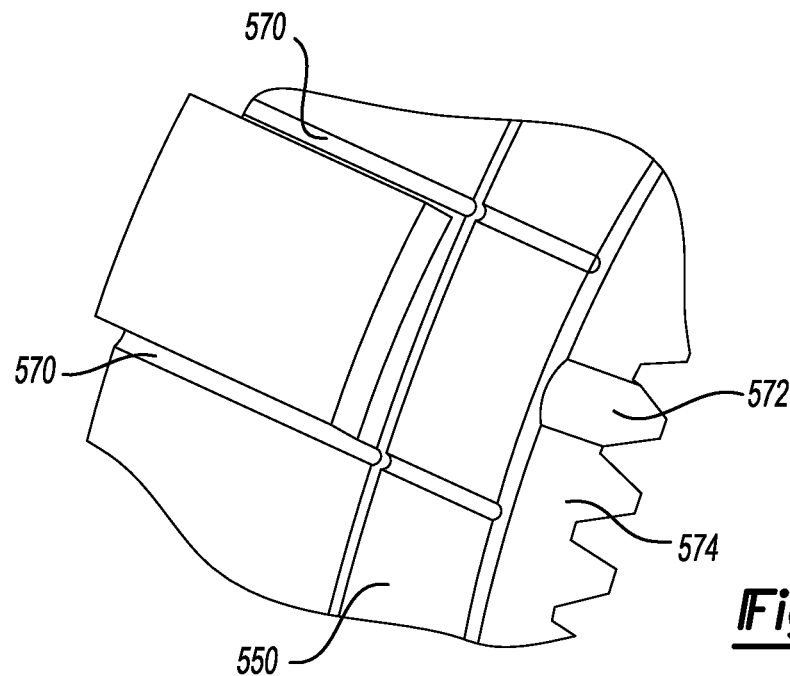
FIG. 5 is an enlarged view of a portion of the transmission illustrated in FIG. 4.
Figure 6:
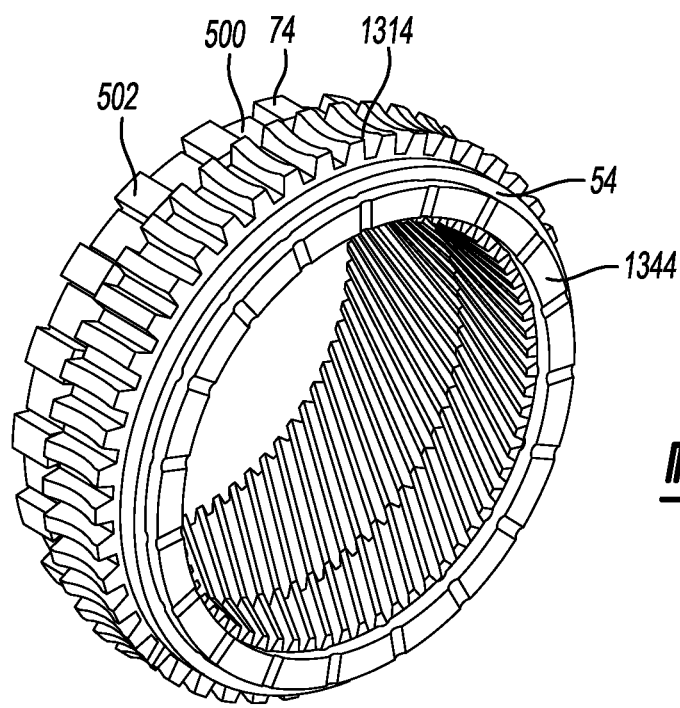
FIG. 6 is a perspective view of the portion of the transmission illustrated in FIG. 4.

With reference to FIGS. 4 and 5, a plurality of first oil grooves 570 can be formed on the outer perimeter of the bearing hub 550 and/or a plurality of second oil grooves 572 can be formed on an axial end face 574 of the bearing hub 550. The first oil grooves 570 can be formed such that lubricant received therein is directed (via gravity feed) toward the axial end face 574 of the bearing hub 550. In the particular example provided, the first oil grooves 570 are straight, have a uniform depth, and extend axially along the outer perimeter of the bearing hub 550, but it will be appreciated that the first oil grooves 570 could be configured differently (e.g., spiral or helical, tapering depth). Similarly, the second oil grooves 572 can be formed such that lubricant received therein is directed to surfaces 560 and 562 of the bushing bore 552 and the bearing hub 550 that contact one another. In the particular example provided, the second oil grooves 572 are straight, have a uniform depth and extend radially inwardly from the outer surface of the bearing hub 550, but it will be appreciated that the second oil grooves 572 could be configured differently (e.g., spiral or helical, tapering depth). It will also be appreciated that the second oil grooves 572 can permit the axial end face 574 of the bearing hub 550 to function in a manner similar to a thrust washer.

While the first gear 54 has been illustrated and described as including the worm gear 1314 for its toothed exterior surface, it will be appreciated that the toothed exterior surface could be formed differently to accommodate a differently configured drive member. In the example of FIGS. 7 and 8, the first ring gear 54' has a toothed exterior surface that comprises a plurality of helical gear teeth 1314'. While the direction, sense or hand of the helical teeth on the outside diameter and the inside diameter of the first ring gear 54' are not critical to the invention, those of skill in the art will appreciate that thrust forces can be canceled out if the helical teeth of the outside diameter of the ring gear 54' are formed in one direction, sense or hand and the helical teeth on the inside diameter of the ring gear 54' are formed in a second, opposite direction, sense or hand.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drive module comprising:
a transmission having a transmission housing, a first planetary gearset and a second planetary gearset, the first planetary transmission having a first ring gear and a first transmission output member, the second planetary transmission having a second ring gear and a second transmission output member;
a differential assembly having a differential case that is rotatably coupled to the second transmission output member, the differential assembly having a first differential output and a second differential output;
a first shaft coupled for rotation to both the first differential output and the first transmission output member;
a second shaft coupled to the second differential output for rotation therewith;
wherein the first ring gear is rotatably mounted in the transmission housing, wherein the second ring gear is non-rotatably mounted in the transmission housing, wherein the first and second ring gears nest such that one of the first and second ring gears has a bearing hub that is received into a bushing bore that is formed into the other one of the first and second ring gears, and wherein the bearing hub frictionally engages an inside surface of the bushing bore when the bearing hub is received into the bushing bore to thereby align a central axis of the first ring gear to a central axis of the second ring gear.

2. The drive module of claim 1, wherein a thrust washer is disposed between the transmission housing and the first ring gear and wherein the first ring gear is received between the second ring gear and the thrust washer.

3. The drive module of claim 1, wherein a plurality of first oil grooves is formed on an outer perimeter of the bearing hub.

4. The drive module of claim 3, wherein the first oil grooves extend axially along the outer perimeter of the bearing hub.

5. The drive module of claim 3, wherein a plurality of second oil grooves are formed on an axial face of the bearing hub that is received into the bushing bore.

6. The drive module of claim 1, wherein a plurality of gear teeth are formed about an exterior perimeter of the first ring gear.

7. The drive module of claim 6, wherein the gear teeth comprise worm gear teeth.

8. The drive module of claim 6, wherein the gear teeth comprise helical gear teeth.

9. The drive module of claim 6, further comprising a transmission input gear that is meshingly engaged to the gear teeth of the first ring gear.

10. The drive module of claim 9, further comprising a motor that is configured to provide rotary power to drive the transmission input gear.

11. A drive module comprising:
a transmission having a transmission housing, a first planetary gearset and a second planetary gearset, the first planetary transmission having a first ring gear and a first transmission output member, the second planetary transmission having a second ring gear and a second transmission output member;
a differential assembly having a differential case that is rotatably coupled to the second transmission output member, the differential assembly having a first differential output and a second differential output;
a first shaft coupled for rotation to both the first differential output and the first transmission output member;
a second shaft coupled to the second differential output for rotation therewith;
wherein the first ring gear is rotatably mounted in the transmission housing, wherein the first and second ring gears nest such that one of the first and second ring gears has a bearing hub that is received into a bushing bore that is formed into the other one of the first and second ring gears, and wherein the bearing hub frictionally engages an inside surface of the bushing bore when the bearing hub is received into the bushing bore to thereby align a central axis of the first ring gear to a central axis of the second ring gear.

12. The drive module of claim 11, wherein a thrust washer is disposed between the transmission housing and the first ring gear and wherein the first ring gear is received between the second ring gear and the thrust washer.

13. The drive module of claim 11, wherein a plurality of first oil grooves is formed on an outer perimeter of the bearing hub.

14. The drive module of claim 13, wherein the first oil grooves extend axially along the outer perimeter of the bearing hub.

15. The drive module of claim 13, wherein a plurality of second oil grooves are formed on an axial face of the bearing hub that is received into the bushing bore.

16. The drive module of claim 11, wherein a plurality of gear teeth are formed about an exterior perimeter of the first ring gear.

17. The drive module of claim 16, wherein the gear teeth comprise worm gear teeth.

18. The drive module of claim 16, wherein the gear teeth comprise helical gear teeth.

19. The drive module of claim 16, further comprising a transmission input gear that is meshingly engaged to the gear teeth of the first ring gear.

20. The drive module of claim 19, further comprising an electric motor that is configured to provide rotary power to drive the transmission input gear.

21. A drive module comprising:
a transmission having a transmission housing, a first planetary gearset and a second planetary gearset, the first planetary transmission having a first ring gear and a first transmission output member, the second planetary transmission having a second ring gear and a second transmission output member;
a differential assembly having a differential case that is rotatably coupled to the second transmission output member, the differential assembly having a first differential output and a second differential output;
a first shaft coupled for rotation to both the first differential output and the first transmission output member;
a second shaft coupled to the second differential output for rotation therewith;
wherein the first ring gear is rotatably mounted in the transmission housing, wherein the second ring gear is non-rotatably mounted in the transmission housing, and wherein the first ring gear is supported on the second ring gear to thereby align a central axis of the first ring gear to a central axis of the second ring gear.

* * * * *